United States Patent [19]

Chester et al.

[11] Patent Number: 4,575,416

[45] Date of Patent: Mar. 11, 1986

[54] HYDRODEWAXING WITH MIXED ZEOLITE CATALYSTS

[75] Inventors: Arthur W. Chester, Cherry Hill; William D. McHale; Jeffrey H. Yen, both of Swedesboro, all of N.J.

[73] Assignee: Mobil Oil Corporation, New York, N.Y.

[21] Appl. No.: 631,681

[22] Filed: Jul. 16, 1984

[51] Int. Cl.$^4$ .............................................. C10G 45/64
[52] U.S. Cl. ...................................... 208/111; 208/120
[58] Field of Search ................................ 208/111, 120

[56] References Cited

U.S. PATENT DOCUMENTS

| | | | |
|---|---|---|---|
| Re. 28,398 | 4/1975 | Chen et al. | 208/111 |
| 3,686,121 | 8/1972 | Kimberlin, Jr. et al. | 502/67 |
| 3,755,145 | 8/1973 | Orkin | 208/111 |
| 3,758,403 | 9/1973 | Rosinski et al. | 208/120 |
| 3,968,024 | 7/1976 | Gorring et al. | 208/111 |
| 4,229,282 | 10/1980 | Peters et al. | 208/111 |
| 4,289,606 | 9/1981 | Gladrow et al. | 208/120 |
| 4,368,114 | 1/1983 | Chester et al. | 208/120 |
| 4,372,839 | 2/1983 | Oleck et al. | 208/59 |
| 4,376,036 | 3/1983 | Garwood et al. | 208/111 |
| 4,419,220 | 12/1983 | LaPierre et al. | 208/111 |
| 4,428,819 | 1/1984 | Shu et al. | 208/46 |

FOREIGN PATENT DOCUMENTS 0101177  2/1984  European Pat. Off. ............ 208/111

Primary Examiner—John Doll
Assistant Examiner—O. Chaudhuri
Attorney, Agent, or Firm—Alexander J. McKillop; Michael G. Gilman; Malcolm D. Keen

[57] ABSTRACT

A catalytic dewaxing process is improved by the use of a mixed zeolite catalyst which combines the following components: a first zeolitic catalyst having a Constraint Index not less than 1, a second, different, catalytic component of specified characteristics, and a hydrogenation component. This process for preparing the catalyst is also disclosed. Examples of specific combinations of dewaxing catalysts include ZSM-5 and Dealuminized Y, ZSM-5 and ZSM-12, and ZSM-5 and TEA Mordenite.

24 Claims, 8 Drawing Figures

HYDRODEWAXING WITH MIXED ZEOLITE CATALYSTS

BACKGROUND OF THE INVENTION

1. Field of the Invention

This invention relates to a process for dewaxing a hydrocarbon feedstock and particularly to a process for dewaxing using a catalyst containing, in combination, a zeolite with Constraint Index greater than 1, a second, different catalyst component and a hydrogenation component.

2. Discussion of the Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require a considerable resort to empiricism in practical refining. Underlying these quantitative uncertainties is the complexity of the molecular constitution of lubricating oils. Because lubricating oils for the most part are based on petroleum fractions boiling above about 450° F. (230° C.), the molecular weights of the hydrocarbon constitutents are high and these constituents display almost all conceivable structure types. This complexity and its consequences are referred to in well-known treatises, such as, for example, "Petroleum Refinery Engineering", by W. L. Nelson, McGraw-Hill Book Company, Inc., New York, NY, 1958 (Fourth Edition).

In general, the basic premise in lubricant refining is that a suitable crude oil, as shown by experience or by assay, contains a quantity of lubricant stock having a predetermined set of properties, such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining and dewaxing, which basically are physical separation processes in the sense that if all the separated fractions were recombined, one would reconstitute the crude oil.

A refined lubricant stock may be used by itself, or it may be blended with another refined lubricant stock having different properties. Or, the refined lubricant stock, prior to use as a lubricant, may be compounded with one or more additives which function, for example, as antioxidants, extreme pressure additives, and VI improvers.

For the preparation of a high grade distillate lubricating oil stock, the current practice is to vacuum distill an atmospheric tower residuum from an appropriate crude oil as the first step. This step provides one or more raw stocks within the boiling range of about 450° (230° C.) to 1050° F. (565° C.). After preparation of a raw stock of suitable boiling range, it is extracted with a solvent, e.g., furfural, phenol, sulfolane, or chlorex, which is selective for aromatic hydrocarbons, and which removes undesirable components. The raffinate from solvent refining is then dewaxed, for example, by admixing with a solvent, such as a blend of methyl ethyl ketone and toluene. The mixture is chilled to induce crystallization of the paraffin waxes, which are then separated from the raffinate. Sufficient quantities of wax are removed to provide the desired pour point for the raffinate.

Other processes, such as hydrofinishing or clay percolation, may be used if needed to reduce the nitrogen and sulfur content or improve the color of the lubricating oil stock.

Viscosity Index (VI) is a quality parameter of considerable importance for distillate lubricating oils to be used in automotive engines and aircraft engines subject to wide variations in temperature. This index indicates the degree of change of viscosity with temperature. A high VI of 100 indicates an oil that does not tend to become viscous at low temperature or become thin at high temperatures. Measurement of the Saybolt Universal Viscosity of an oil at 100° (38° C.) and 210° F. (100° C.), and referral to correlations, provides a measure of the VI of the oil. For purposes of the present invention, whenever VI is referred to, it is meant the VI as noted in the Viscosity Index tabulations of the ASTM (D567), published by ASTM, 1916 Race Street, Philadelphia, PA, or equivalent.

Catalytic techniques are now available for dewaxing of petroleum stocks. A process of that nature developed by British Petroleum is described in *The Oil and Gas Journal*, dated Jan. 6, 1975, at pages 69–73. See also U.S. Pat. No. 3,668,113. The dewaxing mechanism of catalytic hydrodewaxing is different from that of solvent dewaxing, resulting in some differences in chemical composition. Catalytically dewaxed products produce a haze on standing at 10° F. ($-12°$ C.) above specification pour point for more than twelve hours—known as the Overnight Cloud (ONC) formation. The extent of this ONC formation is less severe with solvent dewaxed oils. Although such an ONC formation does not affect the product quality of catalytically dewaxed oils, it is beneficial to reduce the Overnight Cloud (ONC) formation, since in some areas of the marketplace any increase in ONC is considered undesirable.

U.S. Pat. No. Re. 28,398 describes a process for catalytic dewaxing with a catalyst comprising zeolite ZSM-5. Such a process combined with catalytic hydrofinishing is described in U.S. Pat. No. 3,894,938.

U.S. Pat. No. 3,755,138 describes a process for mild solvent dewaxing to remove high quality wax from a lube stock, which is then catalytically dewaxed to specification pour point.

U.S. Pat. No. 4,053,532 is directed towards a hydrodewaxing operation involving a Fischer-Tropsch synthesis product utilizing ZSM-5 type zeolites.

U.S. Pat. No. 3,956,102 is connected with a process involving the hydrodewaxing of petroleum distillates utilizing a ZSM-5 type zeolite catalyst.

U.S. Pat. No. 4,247,388 describes dewaxing operations utilizing ZSM-5 type zeolites of specific activity.

U.S. Pat. No. 4,222,855 describes dewaxing operations to produce lubricating oils of low pour point and of high VI utilizing zeolites including ZSM-23 and ZSM-35.

U.S. Pat. No. 4,372,839 describes a method for dewaxing crude oils of high wax content by contacting the oils with two different zeolites, e.g., ZSM-5 and ZSM-35.

U.S. Pat. No. 4,419,220 describes a dewaxing process utilizing a Zeolite Beta catalyst.

Copending U.S. patent application, Ser. No. 614,072, filed May 25, 1984, describes a dewaxing catalyst comprising, in combination, a medium pore zeolite and Zeolite Beta in the presence of a hydrogenation component.

The entire contents of these patents and patent application are incorporated herein by reference.

Thus, there are catalysts in the prior art useful for dewaxing processes which result in the production of lubricating oils of enhanced properties. However, improvements in the dewaxing process can be made by utilizing the catalyst of the present invention. These catalysts improve product quality and selectivity for dewaxing processes and hydrocracking.

It is an object of the present invention to provide an improved process for dewaxing a hydrocarbon feedstock.

It is additionally an object of the present invention to provide an improved catalyst having a bifunctional shape-selective hydroisomerization/hydrocracking activity.

It is another object of the present invention to provide improved dewaxing activity, increased product yields, and improved product qualities over that found with existing catalysts, alone or in combination with other catalysts.

These and other objects are fulfilled by the present invention, which is disclosed below.

SUMMARY OF THE INVENTION

It has now been found that a hydrocarbon feedstock may be effectively dewaxed by contacting the feedstock with a dewaxing catalyst which comprises, in combination:

(a) a zeolite catalyst having a Constraint Index not less than 1 and, preferably, from 1 to 12;

(b) an acidic catalytic material having a Constraint Index less than 1 or a zeolite catalyst having a Constraint Index from 1 to 12, where the zeolite catalyst of Group (b) is different from the zeolite catalyst of Group (a); and (c) a hydrogenation component.

The present invention is additionally directed to a process for catalytically dewaxing a hydrocarbon feedstock, which comprises contacting the feedstock at a temperature between about 450° F. (230° C.) and about 750° F. (400° C.) and a pressure between about 100 and 1500 psig with a catalyst in the presence of hydrogen, in which the hydrogen-to-feedstock ratio is between about 800 and 4000 standard cubic feet of hydrogen per barrel of feed, the catalyst comprising about 5 to 60 wt % ZSM-5, about 5 to 60 wt % ZSM-12, about 0 to about 50 wt % alpha-alumina binder, and about 0.1 to 2 wt % finely dispersed platinum, wherein the feedstock is contacted with the catalyst in a fixed reactor bed at a liquid hourly space velocity between about 0.5 and 4; and recovering a dewaxed product.

The present invention is also directed to a process for catalytically dewaxing a hydrocarbon feedstock, which comprises contacting the feedstock at a temperature between about 450° F. (230° C.) and about 750° F. (400° C.) and a pressure between about 100 and 1500 psig with a catalyst in the presence of hydrogen, in which the hydrogen-to-feedstock ratio is between about 800 and 4000 standard cubic feet of hydrogen per barrel of feed, the catalyst comprising about 5 to 60 wt % ZSM-5, about 5 to 60 wt % TEA Mordenite, about 0 to about 50 wt % alpha-alumina binder, and about 0.1 to 2 wt % finely dispersed platinum, wherein the feedstock is contacted with the catalyst in a fixed reactor bed at a liquid hourly space velocity between about 0.5 and 4; and recovering a dewaxed product.

Further, the present invention is directed to a process for catalytically dewaxing a hydrocarbon feedstock, which comprises contacting the feedstock at a temperature between about 450° F. (230° C.) and about 750° F. (400° C.) and a pressure between about 100 and 1500 psig with a catalyst in the presence of hydrogen, in which the hydrogen-to-feedstock ratio is between about 800 and 4000 standard cubic feet of hydrogen per barrel of feed, the catalyst comprising about 5 to 60 wt % ZSM-5, about 5 to 60 wt % Dealuminized Y, about 0 to about 50 wt % alpha-alumina binder, and about 0.1 to 2 wt % finely dispersed platinum, wherein the feedstock is contacted with the catalyst in a fixed reactor bed at a liquid hourly space velocity between about 0.5 and 4; and recovering a dewaxed product.

Further still, the present invention is directed to a dewaxing catalyst comprising, in combination:

(a) a zeolite catalyst having a Constraint Index not less than 1;

(b) an acidic material having a Constraint Index less than 1 and selected from the group consisting of Mordenite, TEA Mordenite, Deal Y, USY, REY, ZSM-4 and ZSM-20, or a zeolite having a Constraint Index from 1 to 12, where the zeolite catalyst from Group (b) is different from the zeolite catalyst of Group (a); and (c) a hydrogenation component.

DESCRIPTION OF PREFERRED EMBODIMENTS

Figure 1:
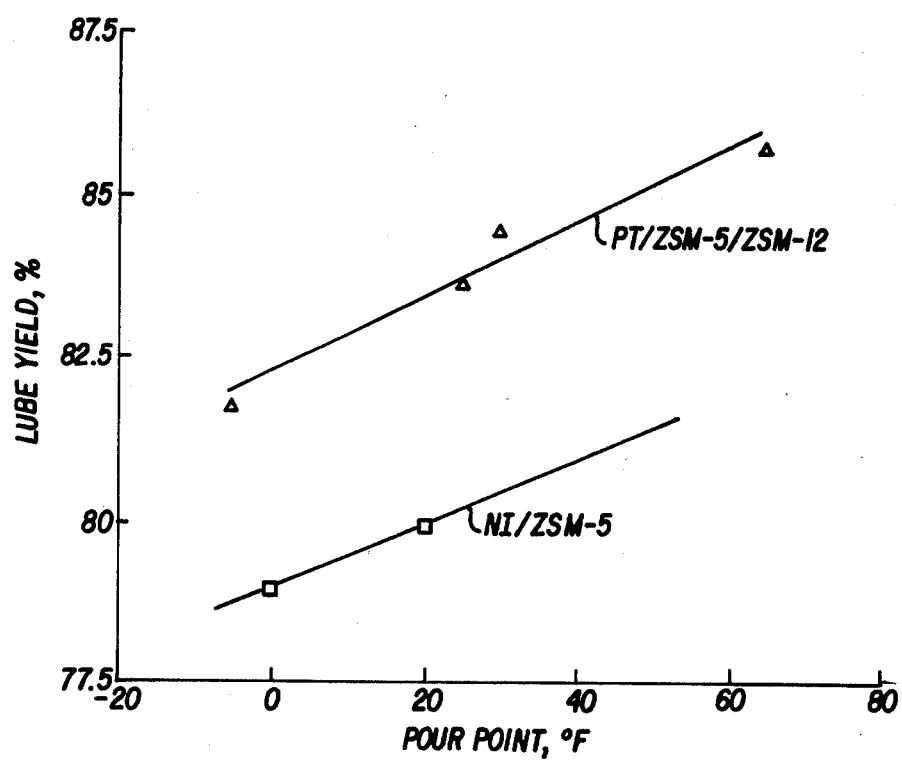
FIG. 1 shows a comparison of lube yield and pour point for Pt/ZSM-5/ZSM-12 and Ni/ZSM-5 on a light neutral chargestock.

The present process may be used to dewax a variety of feedstocks ranging from relatively light distillate fractions up to high boiling stocks, such as whole crude petroleum, reduced crudes, vacuum tower residua, propane deasphalted residua, e.g., brightstock, cycle oils, FCC tower bottoms, gas oils, vacuum gas oils, deasphalted residua and other heavy oils. The feedstock will normally be a $C_{10}+$ feedstock since lighter oils will usually be free of significant quantities of waxy components. The process is particularly useful with waxy distillate stocks, such as gas oils, kerosenes, jet fuels, lubricating oil stocks, heating oils, hydrotreated oil stock, furfural-extracted lubricating oil stock, and other distillate fractions which pour point and viscosity must be maintained within certain specification limits. Lubricating oil stocks, for example, will generally boil above 450° F. (230° C.), more easily above 600° F. (315° C.). For purposes of this invention, lubricating oil or lube oil is that part of a hydrocarbon feedstock having a boiling point of 600° F. (315° C.) or higher as determined by ASTM D-1160 test method.

In general, hydrodewaxing conditions include a temperature between about 450° (230° C.) and about 750° F. (400° C.), and a pressure between 0 and about 3000 psig, preferably between about 100 and about 1000 psig. The liquid hourly space velocity (LHSV), i.e., volume of feedstock per volume of catalyst per hour, is generally between about 0.1 and about 10 and preferably between 0.2 and about 4, and the hydrogen-to-feedstock ratio is generally between about 400 and about 8000 and preferably between about 800 and 4000 standard cubic feet (scf) of hydrogen per barrel of feed.

The catalytic dewaxing process of this invention may be conducted by contacting the feed to be dewaxed with a fixed, stationary bed of the defined crystalline silicate zeolite catalysts, a slurry bed or with a transport bed, as desired.

The mixtures of crystalline zeolites utilized in the particular embodiment are members of a novel class of zeolite materials which exhibit unusual properties. Although these zeolites have unusually low alumina contents, i.e., high silica-to-alumina mole ratios, they are very active for many reactions, e.g., cracking, even when the silica-to-alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g., of the X and A type. Furthermore, carbonaceous deposits, when formed, may be removed by burning at higher than usual temperatures to restore activity. These zeolites, used as catalysts, generally having low coke-forming activity and therefore are conductive to long times on stream between regenerations by burning carbonaceous deposits with oxygen-containing gas, such as air.

For purposes of this invention, the term "zeolite" is meant to represent the class of porotectosilicates, i.e., porous crystalline silicates that contain silicon and oxygen atoms as the major components. Other components may be present in minor amounts, usually less than 14 mole % and preferably less than 4 mole %. These components include aluminum, gallium, iron, boron and the like, with aluminum being preferred, and used herein for illustration purposes. The minor components may be present separately or in mixtures.

The silica-to-alumina ($SiO_2/Al_2O_3$) mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica-to-alumina mole ratio of at least 10 are useful, it is preferred in some instances to use zeolites having much higher silica-to-alumina mole ratios, i.e., ratios of up to at least 500:1 and higher. In fact, zeolites as otherwise characterized herein but which are substantially free of aluminum, i.e., having silica-to-alumina mole ratios up to and including infinity, are found to be useful and even preferable in some instances. Such "high silica" zeolites are intended to be included within this description. The novel class of zeolites, after activation, acquire an intra-crystalline sorption affinity for normal hexane which is greater than that for water, i.e., they exhibit "hydrophobic" properties.

The silica/alumina ratios referred to in this specification are the structural or framework ratios, that is, the ratio for the $SiO_4$ to the $AlO_4$ tetrahedra, which together constitute the structure of which the zeolite is composed. This ratio may vary from the silica/alumina ratio determined by various physical and chemical methods. For example, a gross chemical analysis may include aluminum, which is present in the form of cations associated with the acidic sites on the zeolite, thereby giving a low silica/alumina ratio. Similarly, if the ratio is determined by thermogravimetric analysis (TGA) of ammonia desorption, a low ammonia titration may be obtained if cationic aluminum prevents exchange of the ammonium ions onto the acidic sites. These disparities are particularly troublesome when certain treatments, such as the dealuminization methods described below which result in the presence of ionic aluminum free of the zeolite structure, are employed. Due care should therefore be taken to ensure that the framework silica/alumina ratio is correctly determined.

A portion of the novel class of zeolites useful herein are termed medium or intermediate pore zeolites and have an effective pore size of generally less than about 6 angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Another class of zeolites important to the present invention, i.e., large pore zeolites, are well known to the art and have a pore size sufficiently large to admit the vast majority of components normally found in a feed chargestock. These zeolites are generally stated to have a pore size in excess of 6 angstroms and are represented by, e.g., zeolite Y, Mordenite, ZSM-4 and ZSM-20.

A convenient measure of the extent to which a zeolite provides control molecules of varying sizes to its internal structure is the Constraint Index of the zeolite. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, to which reference is made for details of the method.

Constraint Index (CI) values for some typical materials are:

|  | CI |
| --- | --- |
| ZSM-4 | 0.5 |
| ZSM-5 | 6–8 |
| ZSM-11 | 6–8 |
| ZSM-12 | 2 |
| ZSM-20 | 0.5 |
| ZSM-23 | 9.1 |
| ZSM-34 | 30–50 |
| ZSM-35 | 4.5 |
| ZSM-38 | 2 |
| ZSM-48 | 3.5 |
| TMA Offretite | 3.7 |
| TEA Mordenite | 0.4 |
| Clinoptilolite | 3.4 |
| Beta | 0.6 |
| Mordenite | 0.5 |
| REY | 0.4 |
| Amorphous Silica-Alumina | 0.6 |
| Dealuminized Y (Deal Y) | 0.5 |
| Chlorinated Alumina | *1 |
| Erionite | 38 |

*Less Than

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions as to establish more than one value for the Constraint Index of a particular zeolite. This explains the range of Constraint Index for zeolites, such as ZSM-5, ZSM-12 and ZSM-34.

Zeolite ZSM-4 is taught by U.S. Pat. No. 3,923,639, the disclosure of which is incorporated herein by reference.

Zeolite ZSM-5 is taught by U.S. Pat. No. 3,702,886, and Re. No. 29,949, the disclosures of which are incorporated herein by reference.

Zeolite ZSM-11 is taught by U.S. Pat. No. 3,709,979, issued Jan. 9, 1973, the disclosure of which is incorporated herein by reference.

Zeolite ZSM-12 is taught by U.S. Pat. No. 3,832,449, issued Aug. 27, 1974, the disclosure of which is incorporated herein by reference.

Zeolite ZSM-20 is taught by U.S. Pat. No. 3,972,983, the disclosure of which is incorporated herein by reference.

Zeolite ZSM-23 is taught by U.S. Pat. No. 4,076,342, the disclosure of which is incorporated herein by reference.

Zeolite ZSM-34 is described in U.S. Pat. No. 4,086,186, the disclosure of which is incorporated herein by reference.

Zeolite ZSM-35 is described by U.S. Pat. No. 4,016,245, the disclosure of which is incorporated herein by reference.

Zeolite ZSM-38 is described in U.S. Pat. No. 4,046,859, the disclosure of which is incorporated herein by reference.

Zeolite ZSM-48 is described in U.S. Pat. No. 4,397,827, the disclosure of which is incorporated herein by reference.

The catalyst of the present invention comprises, in part, a zeolite having a Constraint Index not less than 1, and preferably from 1 to 12. Examples of suitable zeolites with their corresponding Constraint Index include but are not limited to:

| First Component | Constraint Index |
| --- | --- |
| ZSM-5 | 6–8 |
| ZSM-11 | 6–8 |
| ZSM-12 | 2 |
| ZSM-22 | 7.3 |
| ZSM-23 | 9 |
| ZSM-34 | 30–50 |
| ZSM-35 | 4.5 |
| ZSM-38 | 2 |
| ZSM-48 | 3.5 |
| TMA Offretite | 3.7 |
| Erionite | 38 |

A preferred first component zeolite is selected from the family of ZSM-5 zeolites, e.g., ZSM-5, ZSM-11, ZSM-23 and ZSM-35, with ZSM-5 being particularly preferred.

Combined with the above-mentioned zeolite is a second, different zeolite selected from the groups consisting of Ultrastable Y, Dealuminized Y, Rare Earth Y, Mordenite, TEA Mordenite, ZSM-4, ZSM-5, ZSM-11, ZSM-12, ZSM-20, ZSM-22, ZSM-23, ZSM-35, ZSM-38 and ZSM-48.

Large pore zeolites, such as those listed below, are useful in the present process.

| Catalyst | Constraint Index |
| --- | --- |
| TEA Mordenite | 0.4 |
| Dealuminized Y (Deal Y) | 0.5 |
| ZSM-4 | 0.5 |
| ZSM-20 | 0.5 |
| Mordenite | 0.5 |
| REY | 0.4 |

Additionally, the large pore component may include a low sodium Ultrastable Y molecular sieve (USY). USY is well known to the art and is described in U.S. Pat. Nos. 3,293,192 and 3,449,070.

The second group of catalysts may also be found in the group consisting of acidic porous amorphous materials, such as amorphous aluminosilicate, chlorinated alumina, acidic clay, alumina or silica-alumina.

A further component of the dewaxing catalyst of the present invention is a hydrogenation-dehydrogenation component (referred to, for convenience, as a hydrogenation component) which is generally a metal or metals of Groups IB, IIB, VA, VIA or VIIIA of the Periodic Table (IUPAC and U.S. National Bureau of Standards approved Table, as shown, for example, in the Chart of the Fisher Scientific Company, Catalog No. 5-702-10). The preferred hydrogenation components are the noble metals of Groups VIIIA, especially platinum, but other noble metals, such as palladium, gold, silver, rhenium or rhodium, may also be used. Combinations of noble metals, such as platinum-rhenium, platinum-palladium, platinum-iridium or platinum-iridium-rhenium, together with combinations with non-noble metals, particularly of Groups VIA and VIIIA are of interest, particularly with metals such as cobalt, nickel, vanadium, tungsten, titanium and molybdenum, for example, platinum-tungsten, platinum-nickel or platinum-nickel-tungsten. Base metal hydrogenation components may also be used, especially nickel, cobalt, molybdenum, tungsten, copper or zinc. Combinations of base metals, such as cobalt-nickel, cobalt-molybdenum, nickel-tungsten, cobalt-nickel-tungsten or cobalt-nickel-titanium, may also be used.

The metal may be incorporated into the catalyst by any suitable method, such as impregnation or exhange, onto the zeolite. The metal may be incorporated in the form of a cationic, anionic or neutral complex, such as $Pt(NH_3)_4^{2+}$, and cationic complexes of this type will be found convenient for exchanging metals onto the zeolite. Anionic complexes are also useful for impregnating metals into the zeolites.

The amount of the hydrogenation-dehydrogenation component is suitably from 0.01 to 25% by weight, normally 0.1 to 5% by weight especially for noble metals, and preferably 0.3 to 1% by weight, although this will, of course, vary with the nature of the component. For example, less of the highly active noble metals, particularly platinum, are required than of the less active metals.

The original cations associated with each of the crystalline silicate zeolites utilized herein may be replaced by a wide variety of other cations according to techniques well known in the art. Typical replacing cations include hydrogen, ammonium, alkyl ammonium and metal cations, including mixtures of the same. Of the replacing metallic cations, particular reference is given to cations of metals such as Rare Earth metals, manganese, as well as metals of Groups II A and B of the Periodic Table, e.g., zinc, and Group VIII of the Periodic Table, e.g., nickel, platinum and palladium.

Typical ion exchange techniques are to contact the particular zeolite with a salt of the desired replacing cation. Although a wide variety of salts can be employed, particular preference is given to chlorides, nitrates and sulfates.

Representative ion exchange techniques are disclosed in a wide variety of patents, including U.S. Pat. Nos. 3,140,249; 3,140,251; and 3,140,253.

Alternatively, the metallic catalyst component can be incorporated into the zeolite by impregnating the zeolite with a solution of the metal or metal compounds or complexes, followed by stripping of the solvent employed. Metallic component incorporation can also be accomplished by sorbing metal compounds or complexes into the zeolite. Thus, such materials as nickel carbonyl or rhodium carbonyl chloride can be sorbed from solution or from the gas phase into the zeolite structure.

Following contact with a solution of the desired replacing cation, the zeolite is then preferably washed with water and dried at a temperature ranging from 150° F. (70° C.) to about 600° F. (320° C.) and thereafter calcined in air, or other inert gas at temperatures ranging from about 500° F. (230° C.) to 1500° F. (820° C.) for periods of time ranging from 1 to 48 hours or more. It has been further found that catalysts of improved selectivity and other beneficial properties may be obtained by subjecting the zeolite to treatment with steam at elevated temperatures ranging from 500° F. (230° C.) to 1200° F. (650° C.) and preferably 750° F. (400° C.) to 1000° F. (540° C.). The treatment may be accomplished in an atmosphere of 100% steam or an atmosphere consisting of steam and a gas which is substantially inert to the zeolites.

A similar treatment can be accomplished at lower temperatures and elevated pressure, e.g., 350°–700° F. (180°–370° C.) at 10 to about 200 atmospheres. The crystalline silicate zeolite utilized in the process of this invention is desirably employed in intimate combination with one or more hydrogenation components in an amount between about 0.1 and about 25% by weight, such as tungsten, vanadium, zinc, molybdenum, rhenium, nickel, cobalt, chromium, manganese, or a noble metal such as platinum or palladium. Such component can be exchanged into the composition, impregnated thereon or physically intimately admixed therewith. Such component can be impregnated into or onto the zeolite, such as, for example, in the case of platinum, by treating the zeolite with a platinum metal-containing ion. Thus, suitable platinum compounds include chloroplatinic acid, platinous chloride and various compounds containing the platinum amine complex.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$, is particularly useful.

Prior to use, the zeolites should be dehydrated at least partially. This can be done by heating to a temperature in the range of 390° to 1110° F. (200° to 600° C.) in an inert atmosphere, such as air, nitrogen, etc., and at atmospheric or subatmospheric pressures for between 1 and 48 hours. Dehydration can also be performed at lower temperatures merely by using a vacuum, but a longer time is required to obtain sufficient amount of dehydration.

The catalysts of this invention are typically prepared by mulling together from about 5 to 60% by weight, preferably 20 to 40% by weight, most preferably 32.5% by weight of each zeolite catalyst and from 0 to about 50% by weight, preferably 0 to 40% by weight, most preferably 35% by weight, binder alpha alumina monohydrate. During the mulling process, a sufficient amount of water containing $H_2PtCl_6$ or $Pt(NH_3)_4(NO_3)_2$ is added slowly to the dry mulling mixture. The mulling process is continued for about 20 minutes or until the mixture is uniform. The mixture is then extruded and dried at 230° F. (110° C.) for approximately 3 hours. The extrudates are crushed and sized to 30/60 mesh material and calcined in air at 1000° F. (540° C.) for 3 hours. The catalyst thus produced contains from about 0.1 to 2% by weight, preferably 0.3 to 1% by weight of finely dispersed platinum. It is to be understood that metal cations other than platinum may be incorporated into the catalyst.

The following examples will serve to illustrate the process of the invention without limiting the same.

EXAMPLES 1–14

In Examples 1–14, the chargestock was a light neutral lubricating oil chargestock having the following properties:

| | |
|---|---|
| 650° F.+ Lube Yield, wt % | 100 |
| Specific Gravity | .8774 |
| API° | 29.8 |

-continued

| | |
|---|---|
| Pour Point | 85° F. |
| Cloud Point | *G120° F. |
| Viscosity KV at 100° C. | 5.341 |
| Sulfur | 0.76 wt. % |
| Basic Nitrogen, ppm | 45 |
| Hydrogen, wt % | 13.7 |
| ASTM Color | *L1.0 |

*G = Greater Than
*L = Less Than

EXAMPLES 1-2

Examples 1 and 2 illustrate the effect of steamed Ni/ZSM-5 ($SiO_2/Al_2O_3=70$) catalyst on the chargestock as it was passed over the catalyst. The catalyst was steamed for about 6 hours at about 900° F. (480° C.) and loaded into a 15/32" (1.16 cm) interior diameter fixed-bed reactor, with a spiral preheater and a 3-zone furnace for good temperature control. After the reactor temperature was lowered to the desired setting, the chargestock was passed over the catalyst along with hydrogen under the controlled process conditions which are recited in Table 1. The product stream leaving the reactor was passed through a heated trap, a cold-water trap, and a gas-sampling bomb. The gas samples were analyzed by conventional procedures. The results are recited in Table 1.

TABLE 1

| Example No. | 1 | 2 |
|---|---|---|
| Temperature, °F. | 580 | 580 |
| Pressure, psig | 400 | 400 |
| Gas | $H_2$ | $H_2$ |
| Circulation, SCF/bbl | 2679 | 2242 |
| LHSV, v/v/hr | 1.00 | 1.02 |
| Yields, Wt % | | |
| $C_1 + C_2$ | 0.1 | 0.0 |
| $C_3$ | 1.5 | 1.7 |
| $C_4$ | 4.0 | 3.9 |
| $C_5$ | 4.3 | 7.8 |
| $C_6$ - 650° F. | 10.8 | 9.1 |
| 650° F.+ Lube | 79.5 (610° F.) | 77.7 (610° F.) |
| Specific Gravity | .8838 | .8805 |
| API° | 28.8 | 29.2 |
| Pour Point, °F. | 15 | 45 |
| KV at 100° F. | 47.72 | 46.30 |
| KV at 210° F. | 6.482 | 6.402 |
| KV at 40° C. | 42.99 | 41.75 |
| KV at 100° C. | 6.325 | 6.248 |
| SUS at 100° F. | 222 | 216 |
| SUS at 210° F. | 47.2 | 46.9 |
| Viscosity Index | 92.8 | 94.9 |
| Sulfur, Wt % | 0.80 | 0.84 |
| Overnight Cloud* (ONC) | Fail | Fail |

*Overnight Cloud was determined by a standard nephelometric instrument. The instrument measured the cloud produced after the samples were maintained stationary for at least 16 hours at 30° F. A product with ONC greater than 10 fails the test.

EXAMPLES 3-4

Examples 3 and 4 illustrate the effect of a 0.5% Pt/ZSM-5 ($SiO_2/Al_2O_3=70$) catalyst on the chargestock. The platinum catalyst was reduced in situ at 900° F. (480° C.) and 400 psig of hydrogen for one hour before introducing the feed into the reactor. The conditions and results of Examples 3 and 4 are shown in Table 2.

TABLE 2

| Example No. | 3 | 4 |
|---|---|---|
| Temperature, °F. | 565 | 565 |
| Pressure, psig | 400 | 400 |
| Gas | $H_2$ | $H_2$ |
| Circulation, SCF/bbl | 2053 | 2493 |
| Time on Stream, days | 3 | 4 |
| Run Time, hours | 22 | 25 |
| LHSV, v/v/hr | 1.28 | 1.00 |
| Material Balance, % | 97.6 | 97.4 |
| Yields, Wt % (Based Upon Material Balance, %) | | |
| $C_1 + C_2$ | 0.2 | 0.5 |
| $C_3$ | 4.4 | 4.6 |
| $C_4$ | 5.4 | 4.9 |
| $C_5$ | 1.5 | 2.7 |
| $C_6$ - 650° F. | 8.8 | 8.8 |
| 650° F.+ Lube | 80.7 | 78.6 |
| Specific Gravity | .8854 | .8868 |
| API° | 28.3 | 28.1 |
| Pour Point, °F. | 5 | −10 |
| Cloud Point, °F. | 8 | 0 |
| KV at 100° F. | 50.42 | 51.90 |
| KV at 210° F. | 6.673 | 6.736 |
| KV at 40° C. | 45.35 | 46.63 |
| KV at 100° C. | 6.505 | 6.569 |
| SUS at 100° F. | 234 | 241 |
| SUS at 210° F. | 48.1 | 48.3 |
| Viscosity Index | 91.5 | 89.1 |
| Sulfur, Wt % | .91 | 0.92 |
| Overnight Cloud | 2 | 2 |
| ASTM Color | 0.5 | 0.5 |

EXAMPLES 5-8

Examples 5-8 illustrate the effect of 0.5% Pt/ZSM-5/ZSM-12 on the chargestock. The catalyst was prepared by compositing 32.5 parts ZSM-5 ($SiO_2/Al_2O_3=70$), 32.5 parts ZSM-12 ($SiO_2/Al_2O_3=54$) and 35 part alumina. The extrudates were reduced to 1/16" (0.16 cm) by a hydraulic ram extruder and were processed to hydrogen form by conventional means. The platinum was incorporated onto the composite catalyst via chloroplatinic acid impregnation with carbon dioxide saturation. The catalyst was then subjected to air calcination at 900° F. (480° C.) for 3 hours. The final composition of the catalyst was as follows:

| Component | Wt. % |
|---|---|
| ZSM-5 | 32.5 |
| ZSM-12 | 32.5 |
| Alumina | 35 |
| Platinum | 0.5 |

The run conditions and results are shown in Table 3.

TABLE 3

| Example No. | 5 | 6 | 7 | 8 |
|---|---|---|---|---|
| Temperature, °F. | 560 | 555 | 575 | 590 |
| Pressure, psig | 400 | 400 | 400 | 400 |
| Gas | $H_2$ | $H_2$ | $H_2$ | $H_2$ |
| Circulation, SCF/bbl (approximate) | 2500 | 2500 | 2500 | 2500 |
| Time on Stream, days | 4 | 5 | 6 | 7 |
| Run Time, hours | 17 | 20 | 19 | 19 |
| LHSV, v/v/hr | 0.95 | 1.12 | 1.07 | 1.07 |
| Material Balance, % | 95.6 | 102.2 | 95.9 | 97.6 |
| Yields, Wt % (Based Upon Material Balance, %) | | | | |
| $C_1 + C_2$ | 0.2 | 0.2 | 0.2 | 1.4 |
| $C_3$ | 1.7 | 1.6 | 2.6 | 3.1 |
| $C_4$ | 3.0 | 2.4 | 2.7 | 2.9 |
| $C_5$ | 3.1 | 3.2 | 2.5 | 3.7 |
| $C_6$ - 650° F. | 7.5 | 6.8 | 8.3 | 8.1 |
| 650° F.+ Lube | 84.5 | 85.8 | 83.7 | 81.8 |
| Specific Gravity | 0.8799 | 0.8768 | 0.8809 | 0.8834 |
| API° | 29.3 | 29.9 | 29.1 | 28.7 |

TABLE 3-continued

| Example No. | 5 | 6 | 7 | 8 |
|---|---|---|---|---|
| Pour Point, °F. | 30 | 65 | 25 | −5 |
| Cloud Point, °F. | 38 | 70 | 32 | 10 |
| KV at 100° F. | 45.61 | 41.55 | 46.09 | 49.13 |
| KV at 210° F. | 6.410 | 6.162 | 6.419 | 6.602 |
| KV at 40° F. | 41.17 | 37.63 | 41.58 | 44.23 |
| KV at 100° C. | 6.257 | 6.018 | 6.265 | 6.442 |
| SUS at 100° F. | 212 | 193.8 | 215 | 229 |
| SUS at 210° F. | 47.2 | 46.4 | 47.2 | 47.8 |
| Viscosity Index | 97.9 | 103.6 | 96.4 | 92.9 |
| Sulfur, Wt %. | 0.76 | 0.75 | 0.72 | 0.72 |
| Basic Nitrogen, ppm | 39 | 39 | 43 | 43 |
| Hydrogen, Wt. % | 13.68 | 13.69 | 13.73 | 13.43 |
| ASTM Color | L0.5 | L0.5 | L0.5 | L0.5 |

EXAMPLES 9–10

Examples 9 and 10 illustrate the effect of 0.5% Pt/ZSM-5/TEA Mordenite on the chargestock. The catalyst was prepared by compositing 32.5 parts NH$_4$ from ZSM-5 (SiO$_2$/Al$_2$O$_3$=70, treated by standard nitrogen precalcination and ammonium exchange steps), 32.5 parts NH$_4$ from TEA Mordenite (Si/Al=25.7, treatments similar to ZSM-5), and 35 parts alpha-Al$_2$O$_3$ monohydrate. The mixture was mulled together with water added to yield about a 50% solids content. After 30 minutes, the mix was dried, formed and sized to 14/25 mesh. Platinum was then added and the sample calcined in a manner similar to that previously described for the catalyst of Examples 5–8. The final composition of the catalyst was as follows:

| Component | Wt. % |
|---|---|
| ZSM-5 | 32.5 |
| TEA Mordenite | 32.5 |
| Alumina | 35 |
| Platinum | 0.5 |

The run conditions and results are shown in Table 4.

TABLE 4

| Example No. | 9 | 10 |
|---|---|---|
| Temperature, °F. | 560 | 570 |
| Pressure, psig | 400 | 400 |
| Gas | H$_2$ | H$_2$ |
| Circulation, SCF/bbl | 3074 | 2242 |
| Time on Stream, days | 7 | 9 |
| Run Time, hours | 64 | 17 |
| LHSV, v/v/hr | 0.99 | 1.19 |
| Material Balance, % | 96.1 | 97.3 |
| Yields, Wt % (Based Upon Material Balance, %) | | |
| C$_1$ + C$_2$ | 0.4 | 0.3 |
| C$_3$ | 2.3 | 2.1 |
| C$_4$ | 2.9 | 3.0 |
| C$_5$ | 3.2 | 2.3 |
| C$_6$ - 650° F. | 5.8 | 7.8 |
| 650° F.+ Lube | 85.4 | 84.5 |
| Specific Gravity | 0.8810 | 0.8822 |
| API° | 29.1 | 28.9 |
| Pour Point,°F. | 15 | 15 |
| Cloud Point, °F. | 38 | 26 |
| KV at 100° F. | 45.41 | 46.94 |
| KV at 210° F. | 6.398 | 6.491 |
| KV at 40° C. | 41.00 | 42.33 |

TABLE 4-continued

| Example No. | 9 | 10 |
|---|---|---|
| KV at 100° C. | 6.246 | 6.335 |
| SUS at 100° F. | 211 | 218 |
| SUS at 210° F. | 47.2 | 47.5 |
| Viscosity Index | 98.2 | 96.2 |
| Sulfur, Wt % | 0.84 | 0.87 |
| Basic Nitrogen, ppm | 41 | 41 |
| Hydrogen, Wt % | 13.77 | 13.62 |
| ASTM Color | L1.0 | L1.0 |

EXAMPLES 11–14

Examples 11–14 illustrate the effect of 0.5% Pt/ZSM-5/Deal Y on the chargestock. The preparation procedures for this catalyst is similar to that described for the catalyst of Examples 9 and 10. The final composition of the catalyst was as follows:

| Component | Wt. % |
|---|---|
| ZSM-5 (SiO$_2$/Al$_2$O$_3$ = 75) | 32.5 |
| Deal Y (SiO$_2$/Al$_2$O$_3$ = 28) | 32.5 |
| Alumina | 35 |
| Platinum | 0.5 |

The run conditions and results are shown in Table 5 following:

TABLE 5

| Example No. | 11 | 12 | 13 | 14 |
|---|---|---|---|---|
| Temperature, °F. | 565 | 555 | 565 | 570 |
| Pressure, psig | 400 | 400 | 400 | 400 |
| Gas | H$_2$ | H$_2$ | H$_2$ | H$_2$ |
| Circulation, SCF/bbl | 2253 | 2315 | 2078 | 2306 |
| Time on Stream, days | 2 | 3 | 5 | 7 |
| Run Time, hours | 20 | 20 | 67 | 19 |
| LHSV, v/v/hr | 1.0 | 1.0 | 1.0 | 0.99 |
| Material Balance, % | 96.6 | 100.3 | 98.1 | 97.7 |
| Yields, Wt % (Based Upon Material Balance, %) | | | | |
| C$_1$ + C$_2$ | 0.2 | 0.1 | 0.1 | 0.1 |
| C$_3$ | 3.3 | 2.1 | 2.0 | 2.1 |
| C$_4$ | 3.5 | 3.0 | 2.8 | 2.8 |
| C$_5$ | 1.6 | 2.0 | 2.0 | 1.9 |
| C$_6$ - 650° F. | 11.4 | 9.3 | 9.8 | 10.0 |
| 650° F.+ Lube | 80.0 | 83.5 | 83.3 | 83.1 |
| Specific Gravity | 0.8859 | 0.8815 | 0.8815 | 0.8809 |
| API° | 28.22 | 29.02 | 29.02 | 29.13 |
| Pour Point, °F. | −5 | 20 | 10 | −5 |
| Cloud Point, °F. | 6 | 36 | 28 | 40 |
| KV at 100° F. | 50.78 | 45.91 | 46.09 | 45.67 |
| KV at 210° F. | 6.665 | 6.439 | 6.442 | 6.412 |
| KV at 40° C. | 45.65 | 41.44 | 41.59 | 41.22 |
| KV at 100° C. | 6.502 | 6.285 | 6.288 | 6.259 |
| SUS at 100° 65 | 236 | 214 | 215 | 213 |
| SUS at 210° F. | 48 | 47.3 | 47.3 | 47.2 |
| Viscosity Index | 89.8 | 98.0 | 97.4 | 97.8 |
| Sulfur, Wt % | 0.87 | 0.85 | 0.81 | 0.81 |
| Basic Nitrogen, ppm | 26 | 37 | 39 | 40 |
| Nitrogen, ppm | 35 | 37 | 36 | 26 |
| Hydrogen, Wt. % | 13.70 | 13.81 | 13.54 | 13.63 |
| ASTM Color | L0.5 | L0.5 | L0.5 | L0.5 |

Comparative results of Examples 1–14 are summarized below in Table 6, based upon data at about 20° F. (−7° C.) pour point for steamed Ni/ZSM-5, Pt/ZSM-5/ZSM-12 and Pt/ZSM-5/Deal Y, and 5° F. pour point for Pt/ZSM-5.

TABLE 6

| Catalyst Examples | Steamed Ni/ZSM-5 1 | Pt/ZSM-5 3 | Pt/ZSM-5/ ZMS-12 7 | Pt/ZSM-5/ ZSM-12 9 | Pt/ZSM-5/ Deal Y 12 |
|---|---|---|---|---|---|
| Pour Point, °F.(°C.) | 15 (−9) | 5 (−15) | 25 (−4) | 15 (−9) | 20 (−7) |

TABLE 6-continued

| Catalyst Examples | Steamed Ni/ZSM-5 1 | Pt/ZSM-5 3 | Pt/ZSM-5/ ZMS-12 7 | Pt/ZSM-5/ ZSM-12 9 | Pt/ZSM-5/ Deal Y 12 |
|---|---|---|---|---|---|
| Reactor Temp, °F.(°C.) | 580(304) | 565(296) | 580(304) | 560(293) | 555(290) |
| Days-On-Stream | — | 3 | 7 | 7 | 3 |
| Gravity, °API | 28.6 | 28.3 | 29.1 | 29.1 | 29.02 |
| Lube Yield, Wt % | 79.5* | 80.7 | 83.7 | 85.4 | 83.5 |
| KV at 40° C., cs | 42.99 | 45.35 | 41.58 | 41.00 | 41.44 |
| KV at 100° C., cs | 6.325 | 6.505 | 6.265 | 6.246 | 6.285 |
| VI | 92.8 | 91.50 | 96.4 | 98.4 | 98.0 |
| Sulfur, Wt % | 0.80 | 0.91 | 0.72 | 0.84 | 0.85 |
| ASTM Color | — | 0.5 | L0.5 | L0.5 | L0.5 |

*610° F. cut
L = Less Than

Compared to the conventionally used lube dewaxing catalyst (Ni/ZSM-5) at about 20° F. pour point, the Pt/ZSM-5/ZSM-12 catalyst improved product VI by 1-2 numbers and lube yield by 4-5 wt %, respectively, Pt/ZSM-5/TEA Mordenite improved VI by 5-6 numbers and lube yield by 5-6 wt % over Ni/ZSM-5 and Pt/ZSM-5/Deal Y improved VI by about 4 numbers and lube yield by about 4 wt %. The data for steamed Ni/ZSM-5, Pt/ZSM-5/ZSM-12 and Pt/ZSM-5/TEA Mordenite can be correlated to 20° F. pour point based on one number in VI for each 5° F. pour point increase. Thus, the product processed with steamed Ni/ZSM-5 would have a VI of about 93.8 at 20° F. pour, the product processed with Pt/ZSM-5/ZSM-12 would have a VI of about 95.4 at 20° F. pour, and the product processed with Pt/ZSM-5/TEA Mordenite would have a VI of about 99.4 at 20° F. pour.

With regard to the platinum catalysts, Pt/ZSM-5/ZSM-12 had approximately a 3 wt % increase in lube yield and a 1 number increase in VI* over Pt/ZSM-5; Pt/ZSM-5/TEA Mordenite had approximately a 4-5 wt % increase in lube yield and a 4-5 number increase in VI over Pt/ZSM-5; and Pt/ZSM-5/Deal Y had approximately a 2-3 wt % increase in lube yield and a 3-4 number increase in VI over Pt/ZSM-5.

*The data for VI were correlated to 20° F. pour point.

Figure 2:
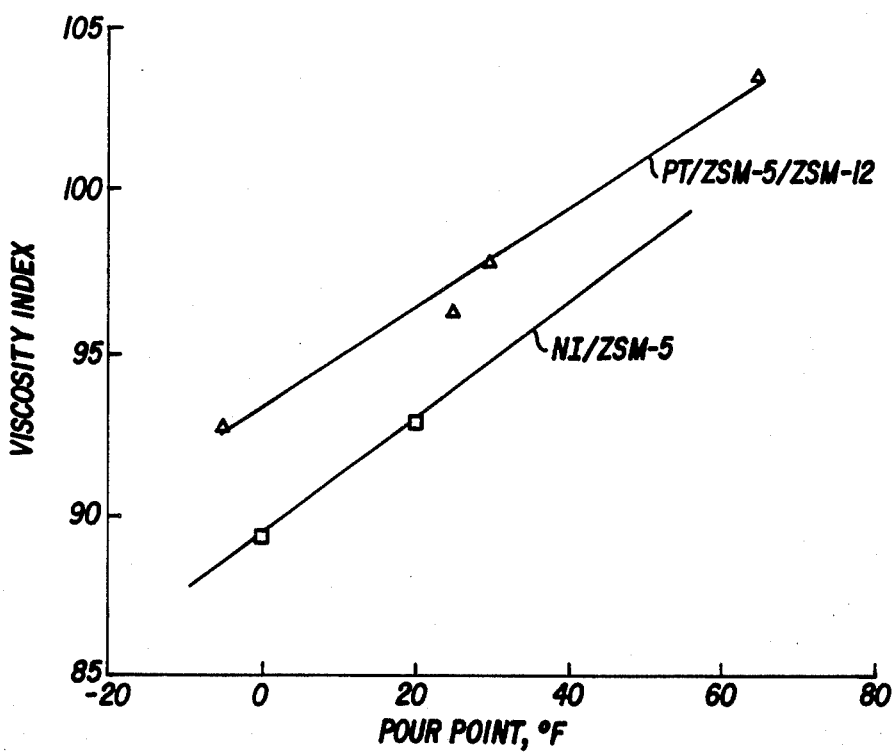
FIG. 2 shows a comparison of viscosity index and pour point for Pt/ZSM-5/ZSM-12 and Ni/ZSM-5 on a light neutral chargestock.

FIGS. 1 and 2 depict the relationship of lube yield and VI to pour point, respectively, for Pt/ZSM-5/ZSM-12 and Ni/ZSM-5. Generally, Pt/ZSM-5/ZSM-12 improved lube yield of 4-5 wt % and VI of 4-5 numbers over the conventionally used Ni/ZSM-5 catalyst in the 0°-40° F. pour range.

Figure 3:
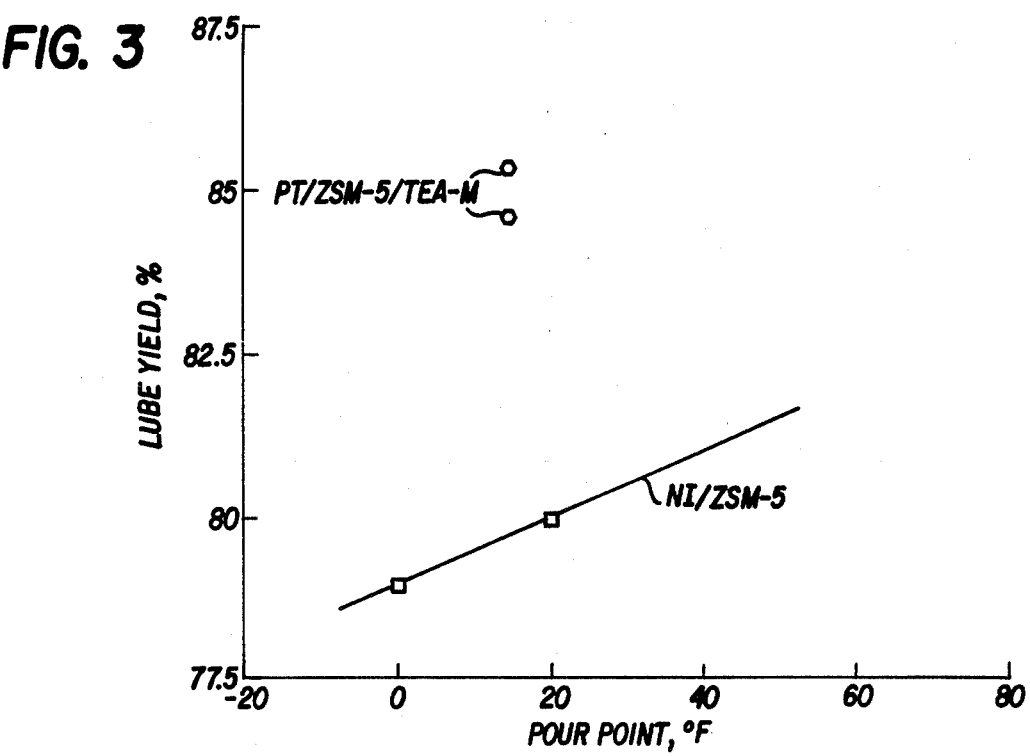
FIG. 3 shows a comparison of lube yield and pour point for Pt/ZSM-5/TEA-Mordenite and Ni-ZSM-5 on a light neutral chargestock.
Figure 4:
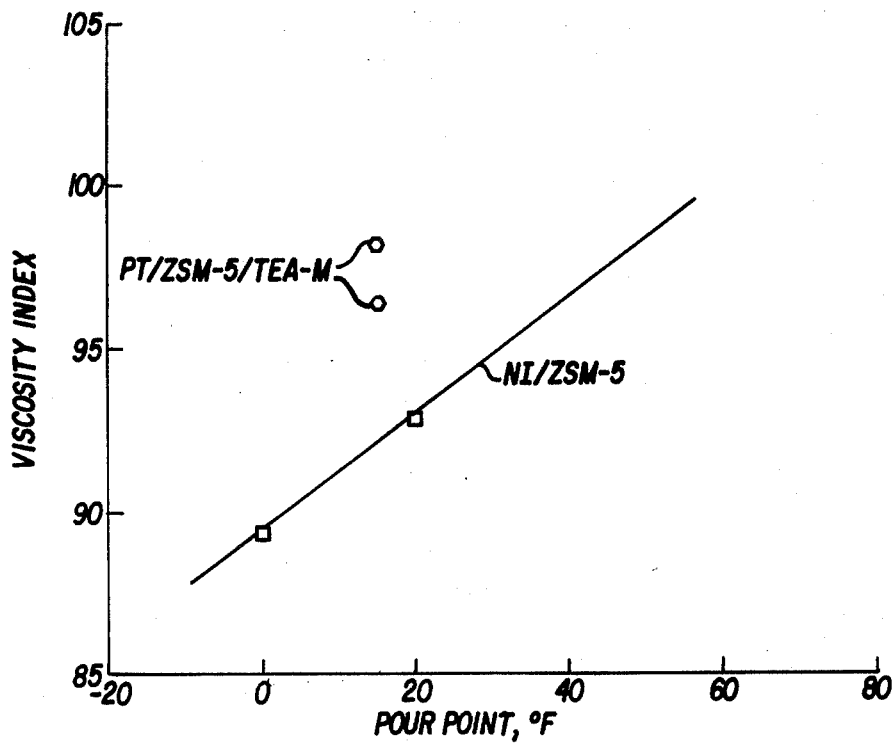
FIG. 4 shows a comparison of viscosity index and pour point for Pt/ZSM-5/TEA-Mordenite and Ni/ZSM-5 on a light neutral chargestock.

Shown in FIGS. 3 and 4 are the relationships of lube yield and viscosity index to pour point, respectively, for Pt/ZSM-5/TEA Mordenite and Ni/ZSM-5. The Pt/ZSM-5/TEA Mordenite catalyst showed improvements in lube yield of 5 wt % and VI of 5 numbers over the standard MLDW catalyst.

Figure 5:
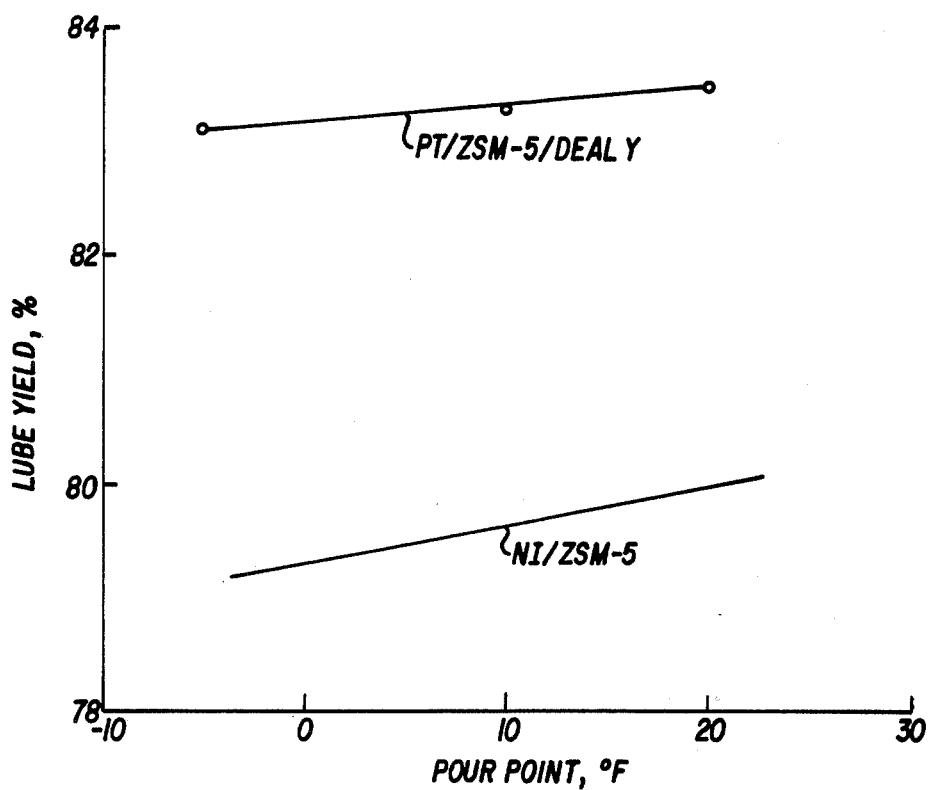
FIG. 5 shows a comparison of lube yield and pour point for Pt/ZSM-5/Deal Y and Ni/ZSM-5 on a light neutral chargestock.
Figure 6:
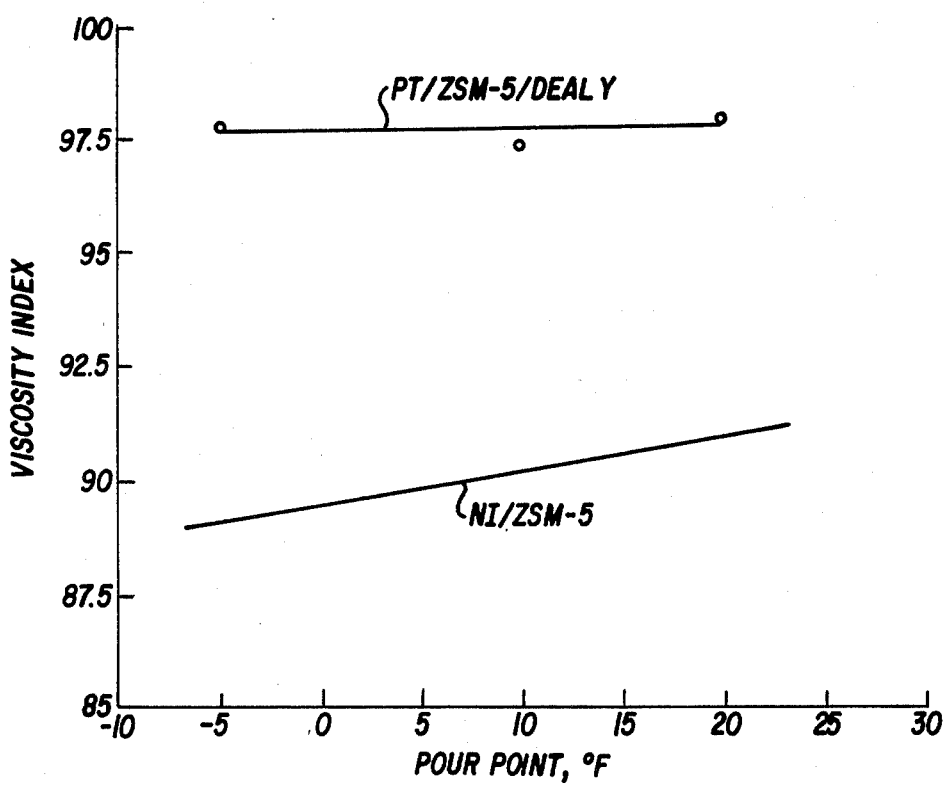
FIG. 6 shows a comparison of viscosity index and pour point for Pt/ZSM-5/Deal Y and Ni/ZSM-5 on a light neutral chargestock.

FIGS. 5 and 6 show the relationships of lube yield and viscosity index to pour point, respectively, for Pt/ZSM-5/Deal Y and Ni/ZSM-5. The Pt/ZSM-5/Deal Y showed improvements in lube yield of about 3 wt % and VI of 6-9 numbers over the conventionally used MLDW catalyst (Ni/ZSM-5).

In general, the catalysts of the present invention improved overnight cloud performance (ONC) over the catalysts of the prior art.

EXAMPLES 15-24

In the following examples, the chargestock used was a waxy bright lubricating oil chargestock raffinate having the following properties:

| | Waxy Bright Stock Raffinate |
|---|---|
| Specific Gravity | 0.9036 |
| API° | 25.1 |
| Pour Point, °F. | 120 |
| Cloud Point, °F. | #120 |
| Viscosity KV at 100° C. | 29.06 |
| Sulfur, Wt. % | 1.13 |
| Basic Nitrogen, ppm | 130 |

# = Greater Than

EXAMPLES 15-20

Examples 15-20 illustrate the effect of steamed Ni/ZSM-5 ($SiO_2/Al_2O_3=70$) on the waxy bright lube stock raffinate. The procedure of Examples 1-2 was followed under conditions specified in Table 7, which also recites the results.

TABLE 7

| Example No. | 15 | 16 | 17 | 18 | 19 | 20 |
|---|---|---|---|---|---|---|
| Temperature, °F. | 600 | 625 | 550 | 550 | 550 | 590 |
| Pressure, psig | 400 | 400 | 400 | 400 | 400 | 400 |
| Gas | $H_2$ | $H_2$ | $H_2$ | $H_2$ | $H_2$ | $H_2$ |
| Circulation, SCF/bbl | 2474 | 2523 | 2435 | 2294 | 2083 | 2273 |
| Time on Stream, days | 1.9 | 2.9 | 2 | 3 | 4 | 5 |
| Run Time, hours | 23 | 22 | 22 | 23 | 24 | 20 |
| LHSV, v/v/hr | 0.96 | 1.09 | 0.77 | 1.09 | 0.60 | 0.55 |
| Material Balance, % | 96.2 | 97.0 | 96.7 | 97.5 | 97.5 | 97.5 |
| Yields, Wt % (Based Upon Material Balance, %) | | | | | | |
| $C_1 + C_2$ | 0.4 | 0.6 | 0.3 | 0.1 | 0.2 | 0.4 |
| $C_3$ | 4.0 | 5.5 | 2.2 | 1.5 | 2.3 | 4.2 |
| $C_4$ | 4.2 | 5.2 | 3.0 | 2.4 | 2.6 | 3.3 |
| $C_5$ | 2.3 | 3.0 | 2.2 | 1.6 | 1.5 | 1.6 |
| $C_6$ - 650° F. | 2.4 | 2.3 | 2.5 | 2.0 | 2.4 | 3.2 |
| 650° F.+ Lube | 86.9 | 83.5 | 90.0 | 92.5 | 91.0 | 87.4 |
| Specific Gravity | 0.9094 | 0.9115 | 0.9086 | 0.9073 | 0.9085 | 0.9105 |
| API° | 24.1 | 23.7 | 24.2 | 24.5 | 24.2 | 23.9 |
| Pour Point, °F. | 0 | 0 | 20 | 40 | 30 | 5 |

TABLE 7-continued

| Example No. | 15 | 16 | 17 | 18 | 19 | 20 |
|---|---|---|---|---|---|---|
| Cloud Point, °F. | 18 | No Cloud | 26 | 54 | NA | 9 |
| KV at 100° F. | 592.6 | 605.0 | 572.1 | 559.5 | 579.1 | 618.6 |
| KV at 210° F. | 32.76 | 32.74 | 33.01 | 3.06 | 33.41 | 33.57 |
| KV at 40° C. | 510.0 | 520.0 | 493.7 | 483.6 | 499.8 | 521.9 |
| KV at 100° C. | 31.62 | 31.59 | 31.87 | 31.93 | 32.26 | 32.39 |
| SUS at 100° F. | 2745 | 2802 | 2650 | 2592 | 2682 | 2865 |
| SUS at 210° F. | 154.9 | 154.8 | 156.1 | 156.3 | 157.9 | 158.6 |
| Viscosity Index | 92.0 | 90.4 | 95.4 | 97.1 | 95.8 | 91.7 |
| Sulfur, Wt % | 1.40 | 1.42 | 1.11 | 1.12 | 1.27 | 1.24 |
| Basic Nitrogen, ppm | 87 | 122 | 112 | 108 | 116 | 122 |
| Hydrogen, Wt. % | 13.04 | 13.00 | 13.24 | 13.28 | 13.12 | 13.12 |
| ASTM Color | L4.0 | 4.0 | L5.5 | L6.0 | D8.0 | D8.0 |

EXAMPLES 21-24

Examples 21-24 illustrate the effect of 0.5 Pt/ZSM-5/Deal Y on the waxy bright stock raffinate. The run conditions and results are shown in Table 8 following. Details of catalyst preparation may be found in the section dealing with Examples 11-14.

TABLE 8

| Example No. | 21 | 22 | 23 | 24 |
|---|---|---|---|---|
| Temperature, °F. | 550 | 560 | 600 | 605 |
| Pressure, psig | 400 | 400 | 400 | 400 |
| Gas | $H_2$ | $H_2$ | $H_2$ | $H_2$ |
| Circulation, SCF/bbl | 2517 | 2455 | 2580 | 2824 |
| Time on Stream, days | 8 | 9 | 10 | 12 |
| Run Time, hours | 21 | 19 | 21 | 65 |
| LHSV, v/v/hr | 0.77 | 0.74 | 0.79 | 0.73 |
| Material Balance, % | 96.0 | 95.6 | 95.4 | 99.1 |
| Yields, Wt % (Based Upon Material Balance, %) | | | | |
| $C_1 + C_2$ | *0.1 | 0.1 | 0.2 | 0.2 |
| $C_3$ | 0.8 | 0.9 | 2.7 | 2.4 |
| $C_4$ | 0.8 | 1.2 | 2.5 | 2.7 |
| $C_5$ | 2.4 | 2.2 | 1.3 | 2.2 |
| $C_6$ - 650° F. | 1.3 | 1.8 | 3.9 | 2.9 |
| 650° F.+ Lube | 94.6 | 93.8 | 89.4 | 89.6 |
| Specific Gravity | 0.9040 | 0.9060 | 0.9081 | 0.9093 |
| API° | 25.03 | 24.68 | 24.32 | 24.11 |
| Pour Point, °F. | 50 | 40 | 0 | 5 |
| Cloud Point, °F. | NA | 56 | 16 | 16 |
| KV at 100° F. | 458.6 | 563.0 | 589.4 | 575.0 |
| KV at 210° F. | 29.29 | 33.06 | 33.06 | 32.58 |
| KV at 40° C. | 397.9 | 486.4 | 507.8 | 495.6 |
| KV at 100° C. | 28.3 | 31.92 | 31.91 | 31.45 |
| SUS at 100° F. | 2124 | 2608 | 2730 | 2663 |
| SUS at 210° F. | 139.2 | 156.3 | 156.3 | 154.1 |
| Viscosity Index | 97.9 | 96.6 | 93.4 | 93.6 |
| Sulfur, Wt % | 1.21 | 1.26 | 1.23 | 1.20 |
| Basic Nitrogen, ppm | 101 | 108 | 113 | 113 |
| Nitrogen, ppm | 140 | 130 | 310 | 120 |
| Hydrogen, Wt. % | 13.58 | 13.37 | 13.29 | 13.21 |
| ASTM Color | L3.0 | L3.0 | L3.0 | L3.0 |

*Approximate

Comparative results of Examples 15-24 are summarized below in Table 9, based upon data at about 5° F. (−15° C.) pour point for the catalysts.

TABLE 9

| Catalyst | Steamed Ni/ZSM-5 | Pt/ZSM-5 Deal Y |
|---|---|---|
| Example | 20 | 24 |
| Pour Point, °F.(°C.) | 5 (−15) | 5 (−15) |
| Days on Stream | 5 | 12 |
| Gravity, °API | 23.9 | 24.11 |
| Lube Yield, Wt % | 87.4 | 89.6 |
| KV at 40° C., cs | 521.9 | 495.6 |
| KV at 100° C., cs | 32.39 | 31.45 |
| Viscosity Index | 91.7 | 93.6 |
| Sulfur, Wt % | 1.24 | 1.20 |

TABLE 9-continued

| Catalyst | Steamed Ni/ZSM-5 | Pt/ZSM-5 Deal Y |
|---|---|---|
| Example | 20 | 24 |
| ASTM Color | D8.0 | L3.0 |

Figure 7:
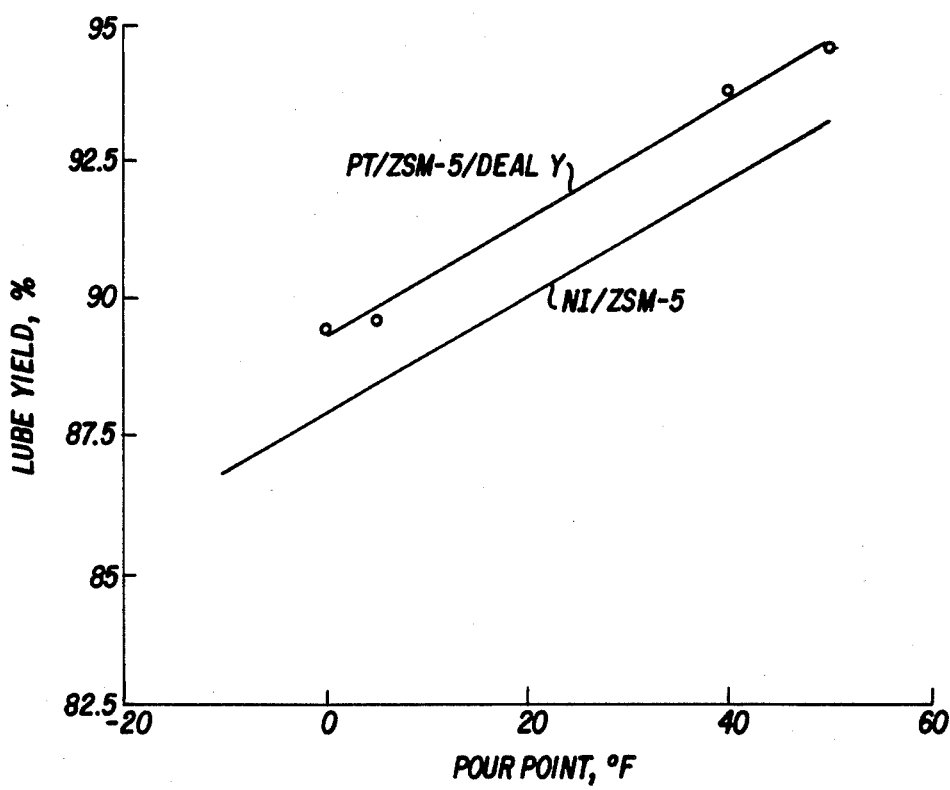
FIG. 7 shows a comparison of lube yield and pour point for Pt/ZSM-5/Deal Y and Ni/ZSM-5 on a waxy bright lube stock raffinate.
Figure 8:
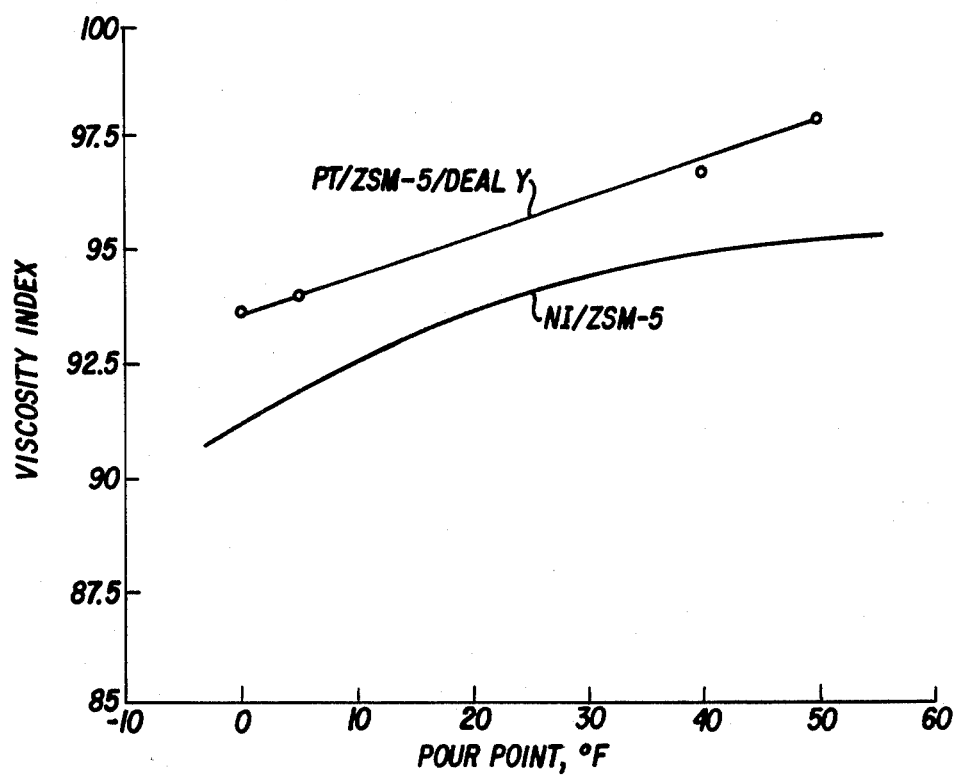
FIG. 8 shows a comparison of viscosity index and pour point of Pt/ZSM-5/Deal Y and Ni/ZSM-5 on a waxy bright lube stock raffinate.

Compared to the conventionally used lube dewaxing catalyst (Ni/ZSM-5), Pt/ZSM-5/Deal Y improved product VI by 1-3 numbers and lube yield by 1-2 wt % for the waxy bright chargestock. FIGS. 7 and 8 show the relationships of lube yield and viscosity index to pour point, respectively, for Pt/ZSM-5/Deal Y and Ni/ZSM-5. Pt/ZSM-5/Deal Y produces a product with improved ASTM color compared to steamed Ni/ZSM-5. Therefore, Pt/ZSM-5/Deal Y has been found to be more effective than Ni/ZSM-5 for both light neutral and bright feedstocks.

Thus, the herein described catalyst has been shown to be an effective dewaxing catalyst possessing both isomerization and shape selective cracking activities. Such catalysts improve product quality and selectivity for dewaxing processes.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A process for catalytically dewaxing a hydrocarbon lubricating oil feedstock comprising contacting said feedstock with a dewaxing catalyst, said dewaxing catalyst comprising, in combination:
   (a) a zeolite catalyst having a Constraint Index not less than 1,
   (b) an acidic catalytic material selected from the group consisting of Mordenite, TEA Mordenite, Dealuminized Y, Ultrastable Y, Rare Earth Y, amorphous silica-alumina, chlorinated alumina, ZSM-4 and ZSM-20, and
   (c) a hydrogenation component, and recovering a dewaxed product.

2. The process according to claim 1, wherein said zeolite from group (a) is selected from the group consisting of ZSM-5, ZSM-11, ZSM-12, ZSM-22, ZSM-23, ZSM-34, ZSM-35, ZSM-38, ZSM-48, TMA Offretite and Erionite.

3. The process according to claim 1, wherein said zeolite from group (a) has a Constraint Index from 1 to 12.

4. The process according to claim 3, wherein said acidic material from group (b) is TEA Mordenite.

5. The process according to claim 3, wherein said acidic material from group (b) is Dealuminized Y.

6. The process according to claim 1, wherein said hydrogenation component is a metal selected from any of Groups VI, VII and VIII of the Periodic Table and mixtures thereof.

7. The process according to claim 1, wherein said hydrogenation component is a noble metal.

8. The process according to claim 7, wherein said noble metal is selected from the group consisting of platinum and palladium.

9. The process according to claim 1, wherein said dewaxing catalyst further comprises a binder, said binder being selected from the group consisting of alpha-alumina monohydrate, silica, silica-alumina, naturally-occurring clays and mixtures thereof.

10. The process according to claim 1, wherein said zeolite from group (a) is present in an amount from 5 to 60 wt. % and said acidic material from group (b) is present in an amount from 5 to 60 wt. %.

11. The process according to claim 10, wherein said zeolite from group (a) is present in an amount of 32.5 wt. %, said acidic material from group (b) in an amount of 32.5 wt. %, and said binder in an amount of 35 wt. %.

12. A process for catalytically dewaxing a hydrocarbon lubricating oil feedstock comprising contacting said feedstock with a dewaxing catalyst, said dewaxing catalyst comprising, in combination:
(a) a first zeolite catalyst selected from the group consisting of ZSM-5, ZSM-11, ZSM-12, ZSM-22, ZSM-23, ZSM-34, ZSM-35, ZSM-38, ZSM-48, TMA Offretite and Erionite,
(b) a second catalyst selected from the group consisting of ZSM-12, ZSM-22, ZSM-38 and ZSM-48, said second zeolite catalyst being different from said first zeolite catalyst, and
(c) a hydrogenation component, and
recovering a dewaxed product.

13. The process according to claim 12, wherein said zeolite catalyst from group (a) is ZSM-5.

14. The process according to claim 13, wherein the zeolite catalyst from group (b) is ZSM-12.

15. The process according to claim 12, wherein said hydrogenation component is a metal selected from any of Groups VI, VII and VIII of the Periodic Table and mixtures thereof.

16. The process according to claim 12, wherein said hydrogenation component is a noble metal.

17. The process according to claim 16, wherein said noble metal is selected from the group consisting of platinum and palladium.

18. The process according to claim 12, wherein said dewaxing catalyst further comprises a binder, said binder being selected from the group consisting of alpha-alumina monohydrate, silica, silica-alumina, naturally-occurring clays and mixtures thereof.

19. The process according to claim 12, wherein said zeolite catalyst from group (a) is present in an amount from 5 to 60 wt. % and said zeolite catalyst from group (b) is present in an amount from 5 to 60 wt. %.

20. The process according to claim 18, wherein said zeolite catalyst from group (a) is present in an amount of 32.5 wt. %, said zeolite catalyst from group (b) in an amount of 32.5 wt. %, and said binder in an amount of 35 wt. %.

21. The process according to claim 12, wherein said feedstock is contacted with said catalyst at a temperature between about 450° and about 750° F.

22. A process for catalytically dewaxing a hydrocarbon lubricating oil feedstock, said process comprising contacting said feedstock at a temperature between about 450° F. and about 750° F. and a pressure between about 100 and 1500 psig with a catalyst in the pressure of hydrogen in which the hydrogen-to-feedstock ratio is between about 800 and 4000 standard cubic feet of hydrogen per barrel of feed, said catalyst comprising about 5 to 60 wt % ZSM-5, about 5 to 60 wt % ZSM-12, about 0 to about 50 wt % alpha-alumina monohydrate binder, and about 0.1 to 2 wt % finely dispersed platinum, wherein said feedstock is contacted with said catalyst in a fixed reactor bed at a liquid hourly space velocity between about 0.5 and 4, and recovering a dewaxed product.

23. A process for catalytically dewaxing a hydrocarbon lubricating oil feedstock, said process comprising contacting said feedstock at a temperature between about 450° F. and about 750° F. and a pressure between about 100 and 1500 psig with a catalyst in the presence of hydrogen in which the hydrogen-to-feedstock ratio is between about 800 and 4000 standard cubic feet of hydrogen per barrel of feed, said catalyst comprising about 5 to 60 wt % ZSM-5, about 5 to 60 wt % of TEA Mordenite, about 0 to about 50 wt % alpha-alumina monohydrate binder, and about 0.1 to 2 wt % finely dispersed platinum, wherein said feedstock is contacted with said catalyst in a fixed reactor bed at a liquid hourly space velocity between about 0.5 and 4, and recovering a dewaxed product.

24. A process for catalytically dewaxing a hydrocarbon lubricating oil feedstock, said process comprising contacting said feedstock at a temperature between about 450° F. and about 750° F. and a pressure between about 100 and 1500 psig with a catalyst in the presence of hydrogen in which the hydrogen-to-feedstock ratio is between about 800 and 4000 standard cubic feet of hydrogen per barrel of feed, said catalyst comprising about 5 to 60 wt % ZSM-5, about 5 to 60 wt % of Dealuminized Y, about 0 to about 50 wt % alpha-alumina monohydrate binder, and about 0.1 to 2 wt % finely dispersed platinum, wherein said feedstock is contacted with said catalyst in a fixed reactor bed at a liquid hourly space velocity between about 0.5 and 4, and recovering a dewaxed product.

* * * * *